(12) United States Patent
Kim

(10) Patent No.: US 11,713,069 B2
(45) Date of Patent: Aug. 1, 2023

(54) STEER-BY-WIRE SYSTEM

(71) Applicants: HYUNDAI MOTOR COMPANY, Seoul (KR); KIA MOTORS CORPORATION, Seoul (KR)

(72) Inventor: Jeong Soo Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 212 days.

(21) Appl. No.: 17/081,649

(22) Filed: Oct. 27, 2020

(65) Prior Publication Data

US 2021/0139069 A1 May 13, 2021

(30) Foreign Application Priority Data

Nov. 7, 2019 (KR) .................. 10-2019-0141340

(51) Int. Cl.
| | |
|---|---|
| *B62D 5/00* | (2006.01) |
| *B62D 5/04* | (2006.01) |
| *B62D 6/00* | (2006.01) |
| *B62D 7/16* | (2006.01) |
| *B62D 7/18* | (2006.01) |

(52) U.S. Cl.
CPC .............. *B62D 5/001* (2013.01); *B62D 7/18* (2013.01)

(58) Field of Classification Search
CPC ........ B62D 5/001; B62D 5/04; B62D 5/0457; B62D 6/00; B62D 6/002; B62D 6/003; B62D 7/16; B62D 7/18; B62D 15/021; B60Y 2400/301; G01L 5/221
See application file for complete search history.

(56) References Cited

U.S. PATENT DOCUMENTS

| | | | |
|---|---|---|---|
| 2016/0308483 A1* | 10/2016 | Ogoshi | ................ H02P 7/29 |
| 2019/0047618 A1* | 2/2019 | Hultén | ................ B60W 10/30 |
| 2020/0070872 A1* | 3/2020 | Ushiro | ................ B62D 5/0481 |
| 2020/0108858 A1* | 4/2020 | Moreillon | ............ B62D 6/002 |

FOREIGN PATENT DOCUMENTS

| | | | |
|---|---|---|---|
| CN | 114889689 A | * | 8/2022 |
| KR | 10-2010-0015056 A | | 2/2010 |
| KR | 10-2015-0015568 A | | 2/2015 |
| KR | 1020190094934 A | * | 8/2019 |
| WO | WO-2017069168 A1 | * | 4/2017 ........ B62D 15/024 |

* cited by examiner

*Primary Examiner* — James M Dolak
*Assistant Examiner* — Daniel M. Keck
(74) *Attorney, Agent, or Firm* — Lempia Summerfield Katz LLC

(57) ABSTRACT

A steer-by-wire system includes: a steering wheel to generate a steering input, a sensor part to measure the steering input of the steering wheel, a controller to calculate a steering angle of a wheel based on the steering input measured by the sensor part, an actuator assembly located at an axle beam and configured to provide a steering driving force to the wheel, and a tie rod engaged with the actuator assembly and configured to vary the steering angle of the wheel.

10 Claims, 3 Drawing Sheets

STEER-BY-WIRE SYSTEM

CROSS-REFERENCE TO RELATED APPLICATION

This application claims priority to and the benefit of Korean Patent Application No. 10-2019-0141340, filed on Nov. 7, 2019, the entire contents of which are incorporated herein by reference.

FIELD

The present disclosure relates to a steer-by-wire system. More particularly, it relates to a steer-by-wire steering apparatus of an integrated axle-type vehicle and relates to a steer-by-wire system configured to control a steering angle of a wheel using an electromagnetic actuator.

BACKGROUND

The statements in this section merely provide background information related to the present disclosure and may not constitute prior art.

Generally, a power steering device which generates a steering force of a vehicle is designed and operated to use a hydraulic pressure so as to allow a rapid steering while allowing an operation force of a steering to be lightly and smoothly.

This power steering device can perform a steering operation with a small force, select a steering gear ratio regardless of the steering force, and absorb an impact from a road surface to prevent delivery of the impact to a handle.

For example, an electric steering system is used which, when a vehicle is driving at a low speed, drives a motor through an electronic control unit (ECU) according to a driving condition of the vehicle to provide a light and comfortable steering feeling, and, when the vehicle is driving at a high speed, provides a heavy steering feeling and excellent directional stability, and, in an emergency situation, allow a rapid steering to be performed to provide a driver with an optimal steering condition.

Generally, the electric steering system includes an electrohydraulic power steering (EHPS) system and a motor driven power steering (MDPS) system. Among the EHPS system and the MDPS system, unlike a hydraulic system which assists power by forming a hydraulic pressure in a pump, the MDPS system has a structure which assists steering power with rotational power of a motor and in which the motor generating power and a worm shaft, which is a reduction gear connected to the motor, rotate a worm wheel connected to a steering shaft to assist a steering force.

Further, a rack assisted (R)-MDPS system of the MDPS system is a type which receives a driving torque due to the motor to implement shaft movement of a rack bar. The R-MDPS system generally receives the driving torque of the motor using a belt and a pulley to move the rack bar.

Recently, a steer-by-wire system in which a mechanical connection between a steering wheel and a drive wheel of the vehicle is omitted has been proposed.

The steer-by-wire system can steer the vehicle by receiving a rotation signal of a steering wheel through an ECU to operate a motor drivingly connected to the drive wheel.

Since the mechanical connection between the steering wheel and the drive wheel is omitted, when the steer-by-wire system fails, a fatal accident is inevitably caused.

Accordingly, in an emergency situation, in order to deliver a steering force of a steering wheel to a drive wheel, a mechanical connection structure through a U-joint and a clutch is conventionally implemented. For example, in an ordinary situation, the ECU measures a steering angle of a driver and a torque and then steers the drive wheel by controlling the MDPS system, and, in an emergency situation, the clutch mechanically connects the U-joint to a column of the steering wheel to deliver steering power of the steering wheel to the drive wheel.

However, in the above-described related art, advantageous functions of the steer-by-wire system, for example, a function of increasing responsiveness of the vehicle through transmission of an intent of a rapid steering, a function of varying a steering gear ratio according to a vehicle speed, a function of preventing an unnecessary reverse input, an accurate steering function, and a function of improving freedom of installation did not work properly.

Further, we have discovered that when a dive phenomenon occurs during braking of a vehicle and a spring receives a load to be pressed, there is a problem of causing a geometry error such that a braking pull biasing problem occurs.

SUMMARY

In one aspect, the present disclosure provides a steer-by-wire system with no geometry error through an electromagnetic actuator located at an axle beam.

In another aspect, the present disclosure provides a steer-by-wire system for manipulating a steering angle of a wheel using an electromagnetic driving force between a fixed coil unit and a moving part which constitute the electromagnetic actuator.

Objectives of the present disclosure are not limited to the above-described objectives, and other objectives of the present disclosure, which are not mentioned, can be understood by the following description and also will be apparently understood through forms of the present disclosure. Further, the objectives of the present disclosure can be implemented by means described in the appended claims and a combination thereof.

The steer-by-wire system for achieving the above-described objectives of the present disclosure includes the following configuration.

In one form of the present disclosure, a steer-by-wire system includes: a steering wheel configured to generate a steering input, a sensor part configured to measure the steering input of the steering wheel, a controller configured to calculate a steering angle of a wheel of a vehicle based on the steering input measured by the sensor part, an actuator assembly located at an axle beam and configured to provide a steering driving force to the wheel, and a tie rod engaged with the actuator assembly and configured to vary the steering angle of the wheel.

Further, the actuator assembly may include a fixed coil unit located the axle beam, and a moving part engaged with the wheel through the tie rod, located on at least a part of the fixed coil unit, and configured to move along the fixed coil unit, the moving part is configured to move along the fixed coil unit to vary the steering angle of the wheel in response to the steering input of the controller.

In one form, when the controller applies a current to the fixed coil unit based on the calculated steering angle of the wheel, the moving part is configured to allow the permanent magnet to be moved along the fixed coil unit.

In another form, the moving part may further include a guide part engaged with the axle beam so as to move along the axle beam.

In some forms, the steer-by-wire system may further include a displacement sensor provided at the axle beam corresponding to the guide part and configured to measure displacement of the moving part.

In some forms, the steer-by-wire system may further include a knuckle arm provided at a distal end of the tie rod and configured to be engaged with the wheel.

In some forms, the steer-by-wire system may further include a wheel angle sensor located at the knuckle arm.

In some forms, the sensor part configured to measure the steering input may include: a steering angle sensor which is capable of measuring the steering angle of the steering wheel, and a torque sensor which is capable of measuring a steering torque of the steering wheel.

In some forms, the controller may be configured to receive measured values of a displacement sensor, a steering angle sensor, a torque sensor, and a wheel angle sensor and calculate a steering angle of the wheel corresponding to the steering input of a driver on the basis of one or more among the measured values.

In some forms, the controller may be configured to calculate the steering angle of the wheel based on the values measured by the wheel angle sensor, the displacement sensor, the steering angle sensor, and the torque sensor, and when the steering angle of the wheel does not coincide with the steering angle calculated by the controller according to the steering input, the controller may be configured to compensate for a calculation factor from which the steering angle is calculated.

Other aspects the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
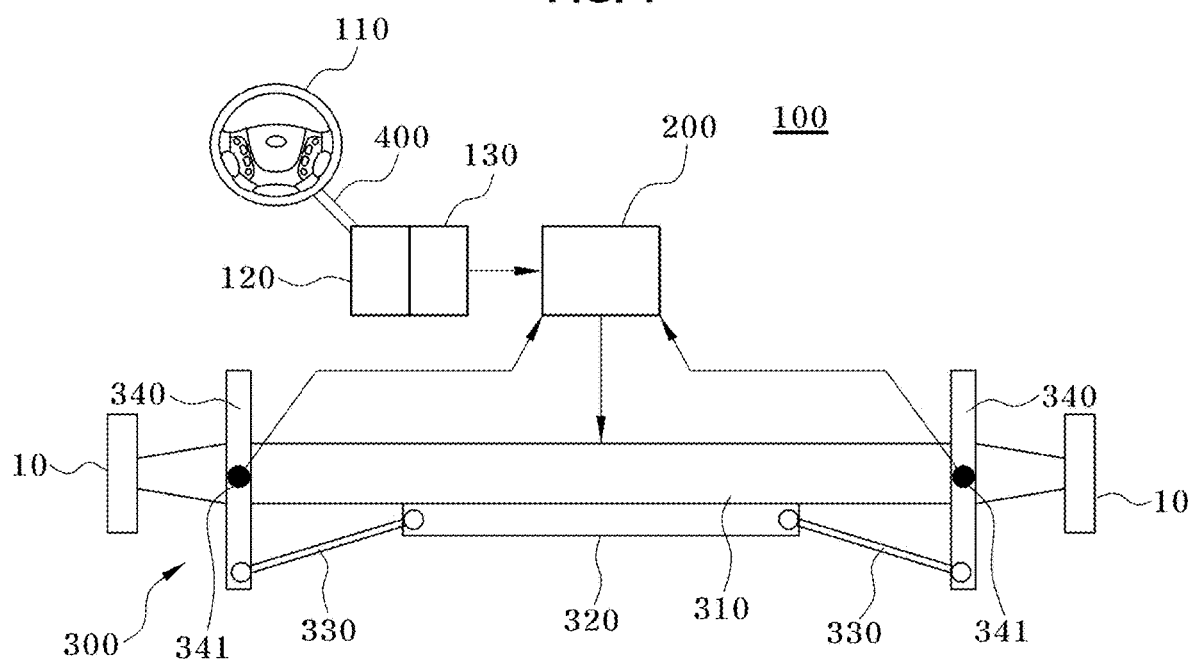
FIG. 1 is a configurational diagram illustrating a steer-by-wire system according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

The exemplary forms of the present disclosure can be modified in various forms, and the scope of the present disclosure should not be construed as being limited to the following forms. These form are provided to more fully describe the present disclosure to those skilled in the art.

The terms "~part," "~unit," "~assembly," and the like used herein mean a unit for processing at least one function or operation, and this unit may be implemented by hardware, software, or a combination of hardware and software.

Further, in this disclosure, a direction of a current flowing in a fixed coil and a direction of a magnetic field formed due to a permanent magnet may be changed so that a direction in which the current is applied and a direction in which the magnetic field is formed may be changed such that a force applied to a moving part may be applied in a left-right direction of an axle beam.

The present disclosure relates to a steer-by-wire system 100 which drives, when a steering input is applied through a steering wheel 110, a tie rod 330 by controlling operations of electromagnetic actuator assembly 310 and 320 in response to the input steering operation.

FIG. 1 is a configurational diagram illustrating the steer-by-wire system 100 according to one form of the present disclosure.

The steer-by-wire system 100 includes: the electromagnetic actuator assembly (310,320) integrally located at the axle beam 300, tie rods 330 located at both ends of the actuator assembly (310,320), and a knuckle arm 340 located at a distal end of each of the tie rod 330 and having an end on which a wheel 10 is mounted.

The steering wheel 110 is located inside a vehicle and receives a steering input from a user when the user manipulates the steering wheel 110. For example, when the user rotates the steering wheel 110, a controller 200 detects the steering input of the steering wheel on the basis of a rotation angle of the steering wheel 110.

In response to the received steering input, the controller 200 controls driving of a moving part 320 of the electromagnetic actuator assembly integrally located at the axle beam 300 such that the moving part 320 of the electromagnetic actuator assembly may be moved along the axle beam 300 in a length direction.

The electromagnetic actuator assembly includes a fixed coil unit 310 located and fixed to the axle beam 300, and the moving part 320 which is spaced apart from the fixed coil unit 310 and moves along the axle beam 300 in the length direction is includes a permanent magnet 321. Therefore, according to a direction in which a current is applied to the fixed coil unit 310, the moving part 320 including the permanent magnet 321 is configured to move in a left-right direction of the axle beam 300.

That is, in response to the steering input which is input to the controller 200, the electromagnetic actuator assembly (310,320) is configured to apply a current to the fixed coil unit 310 such that the moving part 320 moves in a length direction of the axle beam 300. The controller 200 controls a moving length of the moving part 320 in the length direction by controlling an amount of the current applied the fixed coil unit 310.

When the moving part 320 moves along the axle beam 300, the tie rods 330 engaged with both ends of the moving part 320 are configured to be moved by being interlocked with the moving part 320 and wheels 10 connected to distal ends of the tie rods 330 are configured to be rotated according to a steering angle which is calculated by the controller 200.

The controller 200 may calculate the steering angle based on an input angle of the steering wheel 110 and a torque value according to the rotation of the steering wheel 110 so as to perform a steering of the wheels 10.

A steering column 400 engaged with the steering wheel 110 may include a steering angle sensor 120 and may further include a torque sensor 130 which is capable of measuring a torque according to the steering input.

The controller 200 is configured to be receivable one or pieces data from the steering angle sensor 120 and the torque sensor 130 and to calculate the steering angle of the wheel 10 on the basis of the received data to perform driving of the electromagnetic actuator.

Further, the present disclosure includes a guide part 350 located on at least a portion of the moving part 320 engaged with the axle beam 300 and configured to maintain the engagement with the axle beam 300 when the moving part 320 moves. Further, the axle beam 300 at which the guide part 350 is located includes a displacement sensor 360 configured to be capable of measuring the moving distance of the moving part 320.

Further, the present disclosure may include a wheel angle sensor 341 configured to be capable of measuring a variation in steering angle of the wheel 10 according to the steering input.

In one form of the present disclosure, the controller 200 may be configured to receive measured values of the displacement sensor 360, the steering angle sensor 120, the torque sensor 130, and the wheel angle sensor 341 and calculate a steering angle of the wheel 10 corresponding to the steering input of a driver based on at least one value among the measured values.

As described above, the steer-by-wire system 100 of the present disclosure including the steering angle sensor 120, the torque sensor 130, the displacement sensor 360, and the wheel angle sensor 341 is configured to be capable of receiving the variation in steering angle measured according to the steering input, a torque value input into the steering column 400, and data on the moving distance of the moving part 320, calculate the steering angle of the wheel 10 on the basis of the received data through the controller 200, and determines whether the steering angle of the controlled wheel 10 coincides with the steering angle output from the controller 200 through the wheel angle sensor 341.

When the steering angle of the wheel 10 which is actually driven by the controller 200 is different from the steering angle output according to the steering input, the controller 200 may perform feedback control so as to correct the steering angle output on the basis of the received data.

The feedback control is configured to be capable of controlling an intensity of the current applied to the fixed coil unit 310 and adjusting displacement of the moving part 320, performs a correction of a calculation factor which is calculated through the controller 200, and controls the actual steering angle of to the wheel 10 to coincide with the steering input of steering wheel 110.

In one form of the present disclosure, the wheel angle sensor 341 is configured to be located at the knuckle arm 340 which is formed in an area adjacent to the both distal ends of the axle beam 300. The knuckle arm 340 is configured to be engaged with the moving part 320 through the tie rod 330 and to be rotated in the left-right direction around the axle beam 300.

The knuckle arm 340 is configured to be rotatable around the axle beam 300, to be engaged with the tie rod 330, and to be rotated according to the movement of the moving part 320 in a clockwise or counterclockwise direction around the axle beam 300, thereby varying the steering angle of the wheel 10.

Figure 2:
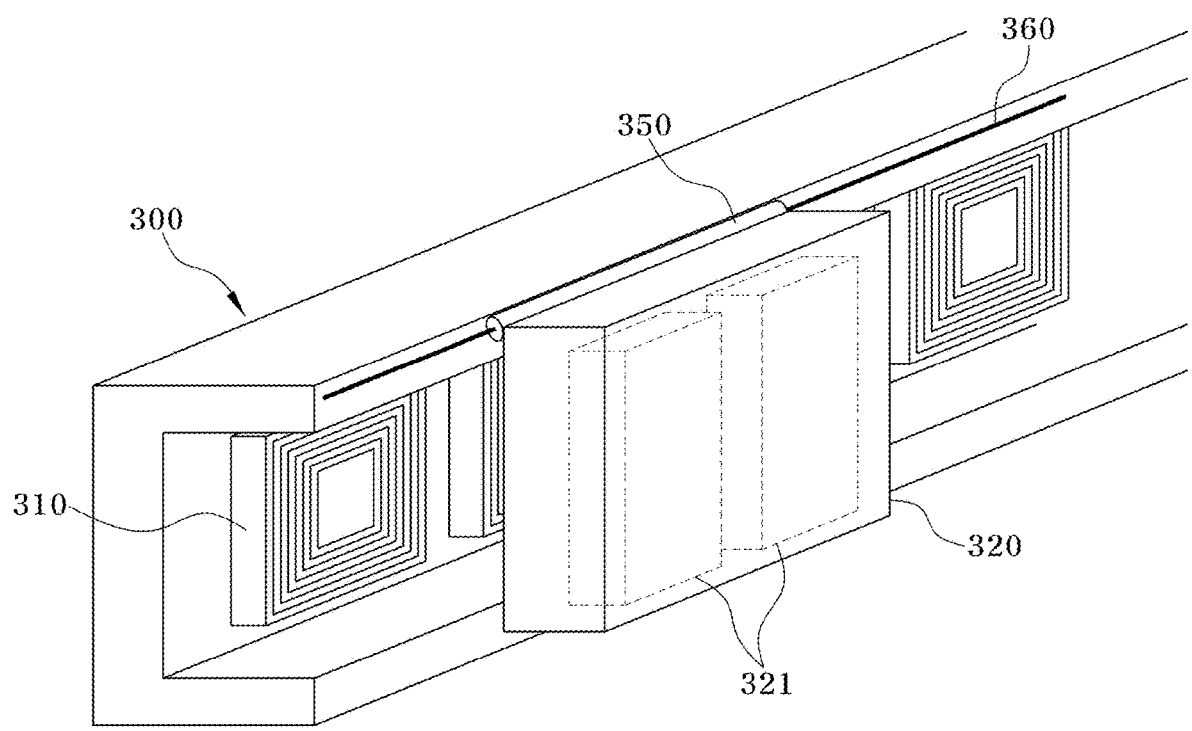
FIG. 2 is an enlarged view illustrating a configuration of an electromagnetic actuator of the steering-by-wire system according to one form of the present disclosure.

FIG. 2 is an enlarged view illustrating the actuator assembly (310,320) according to one form of the present disclosure.

The actuator assembly (310 and 320) located at the axle beam 300 includes the fixed coil unit 310 and the moving part 320. The moving part 320 is configured to move along the fixed coil unit 310 in the length direction of the axle beam 300.

The controller 200 is configured to allow the moving part 320 to move in response to the steering input in the length direction of the axle beam 300. The fixed coil unit 310 is coupled to be engaged with a battery (not shown) located in the vehicle such that a predetermined current from the battery is applied to the fixed coil unit 310 according to a request of the controller 200 and thus the moving part 320 moves.

In one form of the present disclosure, when the moving part 320 is located at a rear side of the axle beam 300, the knuckle arm 340 which is moved in a direction opposite a rotation direction of the steering handle to be located at the distal end of the tie rod 330 is configured to be rotated in the rotation direction of the steering handle about the axle beam 300.

Alternatively, when the moving part 320 is located at a front side of the axle beam 300, the moving part 320 moves in the same direction as the rotation direction of the steering wheel, and thus the tie rod 330 is rotated in the same direction as rotation direction of the steering wheel such that the wheel 10 may be driven to have the steering angle of the steering wheel.

That is, in the steer-by-wire system 100 of the present disclosure, the moving part 320 is configured to move in the left-right direction. Consequently, the moving part 320 may be controlled according to an application direction of the current applied to the fixed coil unit 310, and the application direction of the current applied to the fixed coil unit 310 may be set according to a positional relationship between the axle beam 300 and the moving part 320.

In one form of the present disclosure, one surface of the axle beam 300 is formed to be recessed, and the moving part 320 located to face the recessed one surface is included. Further, the fixed coil unit 310 is configured to be located inside a recessed area, and a plurality of single coils are configured to be located inside the recessed area of the axle beam 300.

The moving part 320 is constituted of a permanent magnet 321, and, when the current is applied to the fixed coil unit 310, a force is applied along the axle beam 300. When an angle between a magnetic field formed by the permanent magnet 321 of the moving part 320 and a flow direction of the current is set to 90 degrees on the same plane, since the force may be applied in a height direction of the plane, the moving part 320 may move in the length direction of the axle beam 300 according to the direction in which the current is applied to the fixed coil unit 310.

When the moving part 320 moves along the axle beam 300, the moving part 320 includes the guide part 350 facing the axle beam 300 in at least a portion thereof. Accordingly, even when the moving part 320 moves, the moving part 320 is configured to be capable of maintaining an engagement state between the axle beam 300 and the moving part 320.

In one form of the present disclosure, the guide part 350 may be configured to be included at an upper end of the moving part 320 facing the axle beam 300. Since the displacement sensor 360 is located at the axle beam 300 and formed along the guide part 350, the controller 200 is configured to receive a displacement of the moving part 320.

As described above, when the current is applied to the fixed coil unit 310 from the battery of the vehicle, the actuator assembly 310 and 320 of the present disclosure are configured such that the moving part 320 including the permanent magnet 321 moves the tie rod 330 engaged with the wheel 10 by being moved in the left-right direction along the axle beam 300.

Figure 3A:
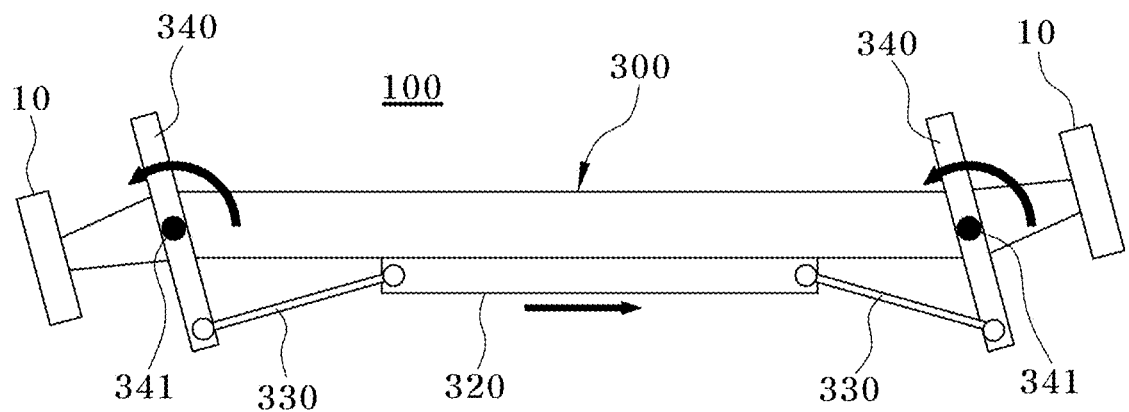
FIG. 3A is an operation diagram illustrating that a left steering of the steering-by-wire system is performed according to one form of the present disclosure.

FIG. 3A illustrates an operation diagram illustrating the steer-by-wire system 100 based on when a left steering of the vehicle is performed based on an upper portion of the vehicle.

As shown the drawing, in one form of the present disclosure, FIG. 3A illustrates a movement relationship of the moving part 320 when the moving part 320 is located and engaged with the rear side of the axle beam 300 and the steering input is applied according to a left rotation of the steering wheel 110.

When a left rotation input of the steering wheel 110 is applied, the controller 200 receives the steering input from the steering angle sensor 120 and the torque sensor 130 and applies the current to the fixed coil unit 310 so as to allow the moving part 320 including the permanent magnet 321 to move to a right side of the vehicle.

That is, when the moving part 320 moves to the right side on the axle beam 300 based on the front side of the vehicle, the tie rod 330 engaged with each of the both ends of the moving part 320 is configured to move to the right side, and the knuckle arm 340 located at the distal end of the tie rod 330 is configured to be rotated in the counterclockwise direction about the axle beam 300. As the knuckle arm 340 is rotated, the wheel 10 is configured to have the steering angle which is input to the left side.

In one form of the present disclosure, the current applied to the fixed coil unit 310 may be applied in a direction perpendicular to a plane shown in the drawing, and the magnetic field of the moving part 320 may be formed from a lower portion to an upper portion based on the axle beam 300 such that the guide part 350 of the moving part 320 is configured to be move to the right side of the axle beam 300.

In another form of the present disclosure, when the magnetic field formed by the permanent magnet 321 is formed in a direction in which the magnetic field is input perpendicular to a height direction of the plane of the drawing and the current flows from an upper portion (the front side of the vehicle) to a lower portion (the rear side of the vehicle) of the drawing, the moving part 320 may move to the right side of the vehicle along the axle beam 300 to maintain a left turning steering angle of the wheel 10.

Figure 3B:
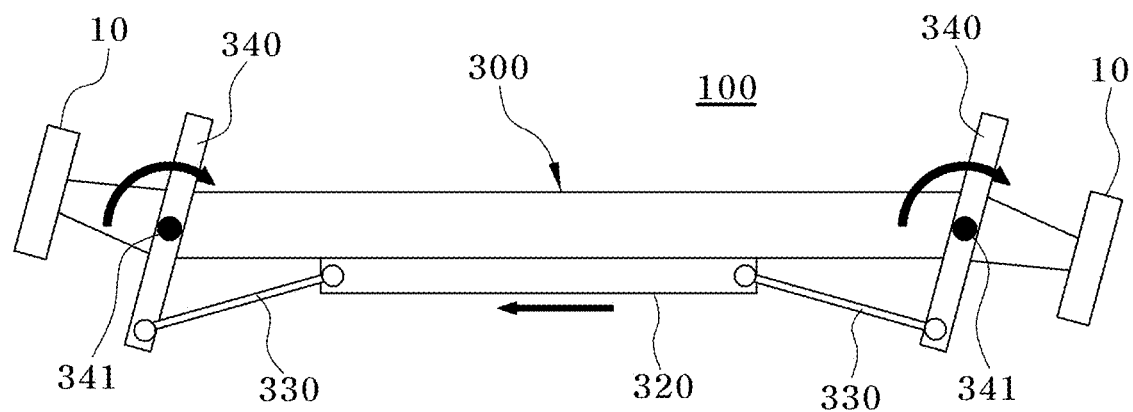
FIG. 3B is an operation diagram illustrating that a right steering of the steering-by-wire system is performed according to one form of the present disclosure.

FIG. 3B illustrates an operation diagram on the basis of the upper portion of the vehicle when the steering input is applied in a direction opposite that of FIG. 3A (a right steering).

As the same configuration as FIG. 3A, in one form of the present disclosure, FIG. 3B illustrates a movement relationship of the moving part 320 when the moving part 320 is located and engaged with the rear side of the axle beam 300 and the steering input is applied according to a left rotation of the steering wheel 110.

When a right rotation input of the steering wheel 110 is applied, the controller 200 receives the steering input from the steering angle sensor 120 and the torque sensor 130 and applies the current to the fixed coil unit 310 so as to allow the moving part 320 including the permanent magnet 321 to move to a left side of the vehicle.

That is, when the moving part 320 moves to the left side on the axle beam 300 based on the front side of the vehicle, the tie rod 330 engaged with each of the both ends of the moving part 320 is configured to move to the left side by being integrated with the moving part 320, and the knuckle arm 340 located at the distal end of the tie rod 330 is configured to be rotated in the clockwise direction about the axle beam 300. As the knuckle arm 340 is rotated, the wheel 10 is configured to have the steering angle which is input to the right side.

The current applied to the fixed coil unit 310 is applied in a direction which is discharged in a vertical direction with respect to the plane of the drawing, the magnetic field of the moving part 320 may be formed from a lower portion to an upper portion based on the axle beam 300 such that the guide part 350 of the moving part 320 is configured to be move to the left side of the axle beam 300.

In still another form of the present disclosure, when the magnetic field formed by the permanent magnet 321 is formed in a direction in which the magnetic field is input perpendicular to a height direction of the plane of the drawing and the current flows from the lower portion (the front side of the vehicle) to the upper portion (the rear side of the vehicle) of the drawing, the moving part 320 may move to the left side of the vehicle along the axle beam 300 to maintain a right turning steering angle of the wheel 10.

In summary, the actuator assembly (310 and 320) of the present disclosure is configured to apply the force to the moving part 320 according to a direction between the current applied to the fixed coil unit 310 and the magnetic field of the permanent magnet 321 located in the moving part 320. The controller 200 receives the steering input of the user and controls the moving part 320 to move in the length direction of the axle beam 300 by applying the current to the fixed coil unit 310 in response to the received steering input.

Further, the controller 200 measures the steering angle of the wheel 10 through the wheel angle sensor 341 on the basis of the measured values from one or more of the steering angle sensor 120 and the torque sensor 130 and determines whether an output value corresponding to the steering input of the steering wheel 110 coincides with the steering angle of the wheel 10 calculated in the controller 200. When the output value corresponding to the steering input of the steering wheel 110 is different from the steering angle of the wheel 10, the controller 200 is configured to perform the feedback control to compensate for the received measured value such that a rotation amount of the steering wheel 110 coincides with the steering angle of the wheel 10.

As described above, the present disclosure provides the steer-by-wire system 100 which performs the control of the actuator such that the wheel 10 has the steering angle corresponding to the request of the user by performing the movement of the moving part 320 in the left-right direction in response to the steering input through the controller 200.

The present disclosure can obtain the following effects according to a combination of the above-described forms and a configuration, which will be described below, and a use relationship.

The present disclosure has an effect of providing a steer-by-wire system including an electromagnetic actuator to provide a steering angle irrelevant to a geometric error caused due to braking of a vehicle.

Further, the present disclosure has an effect of preventing braking biasing by providing the steer-by-wire system including the electromagnetic actuator.

The foregoing detailed description illustrates the present disclosure. Further, the foregoing is intended to illustrate and describe the exemplary forms of the present disclosure, and the present disclosure may be used in various other combinations, modifications, and environments. That is, it is possible to make alternations or modifications without departing from the scope of the present disclosure disclosed in this disclosure, equivalents, and/or within the technical or knowledge scope in the art to which the present disclosure pertains. The described forms are intended to illustrate the best mode for carrying out the technical spirit of the present disclosure and various modification can made in the specific applications and uses of the present disclosure. Therefore, the detailed description is not intended to limit the present disclosure as in the disclosed forms. Further, it should be construed that the appended claims are intended to include another form.

What is claimed is:

1. A steer-by-wire system, comprising:
   a steering wheel configured to generate a steering input;
   a sensor part configured to measure the steering input of the steering wheel;
   a controller configured to calculate a steering angle of a wheel of a vehicle based on the steering input measured by the sensor part;
   an actuator assembly configured to be controlled by the controller and located at an axle beam and configured to provide a steering driving force to the wheel; and
   a tie rod engaged with the actuator assembly and configured to vary the steering angle of the wheel,
   wherein the actuator assembly includes a fixed coil unit located at the axle beam and a moving part engaged with the wheel through the tie rod,
   wherein the moving part includes a permanent magnet; and
   wherein the moving part is configured to allow the permanent magnet to be moved along the fixed coil unit.

2. The steer-by-wire system of claim 1,
   wherein the moving part includes at least a part located adjacent to the fixed coil unit and is configured to move along the fixed coil unit, and
   wherein the moving part is configured to move along the fixed coil unit and vary the steering angle of the wheel.

3. The steer-by-wire system of claim 2, wherein:
   when the controller applies a current to the fixed coil unit based on the calculated steering angle of the wheel, the moving part is configured to allow the permanent magnet to be moved along the fixed coil unit.

4. The steer-by-wire system of claim 2, wherein the moving part further includes a guide part engaged with the axle beam so as to move along the axle beam.

5. The steer-by-wire system of claim 4, further comprising:
   a displacement sensor provided at the axle beam corresponding to the guide part and configured to measure a displacement of the moving part.

6. The steer-by-wire system of claim 1, further comprising:
   a knuckle arm provided at a distal end of the tie rod and configured to be engaged with the wheel.

7. The steer-by-wire system of claim 6, further comprising:
   a wheel angle sensor located at the knuckle arm.

8. The steer-by-wire system of claim 1, wherein the sensor part includes:
   a steering angle sensor configured to measure a steering angle of the steering wheel; and
   a torque sensor configured to measure a steering torque of the steering wheel.

9. The steer-by-wire system of claim 1, wherein the controller is configured to: receive values measured by a displacement sensor, a steering angle sensor, a torque sensor, and a wheel angle sensor, and calculate a steering angle of the wheel corresponding to the steering input of a driver based on at least one value among the measured values.

10. The steer-by-wire system of claim 9, wherein the controller is further configured to:
    calculate the steering angle of the wheel based on the values measured by the wheel angle sensor, the displacement sensor, the steering angle sensor, and the torque sensor, and
    when the steering angle of the wheel does not coincide with the steering angle calculated by the controller, compensate for a calculation factor from which the steering angle is calculated.

\* \* \* \* \*